(12) United States Patent
Lection et al.

(10) Patent No.: US 9,684,443 B2
(45) Date of Patent: *Jun. 20, 2017

(54) MOVING OBJECT ON RENDERED DISPLAY USING COLLAR

(71) Applicant: International Business Machines Corporation, Armonk, NY (US)

(72) Inventors: David B. Lection, Raleigh, NC (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/484,677

(22) Filed: Sep. 12, 2014

(65) Prior Publication Data

US 2015/0033169 A1    Jan. 29, 2015

Related U.S. Application Data

(63) Continuation of application No. 13/194,984, filed on Jul. 31, 2011, now Pat. No. 8,863,027.

(51) Int. Cl.
  *G06F 3/048*    (2013.01)
  *G06F 3/0486*   (2013.01)
  *G06F 3/0488*   (2013.01)
  *G06F 3/0481*   (2013.01)
  *G06F 3/0484*   (2013.01)

(52) U.S. Cl.
  CPC .......... *G06F 3/0486* (2013.01); *G06F 3/0481* (2013.01); *G06F 3/04842* (2013.01); *G06F 3/04845* (2013.01); *G06F 3/04883* (2013.01)

(58) Field of Classification Search
  CPC .. G06F 3/04845; G06F 3/0488; G06F 1/1616; G09G 5/00
  See application file for complete search history.

(56) References Cited

U.S. PATENT DOCUMENTS 5,513,309 A * 4/1996 Meier ................. G06F 3/04845
                                                345/179
7,126,587 B2  10/2006 Kawakami
(Continued)

OTHER PUBLICATIONS

Non-final office action for U.S. Appl. No. 13/194,984 dated Aug. 1, 2013, 28 pp.
(Continued)

*Primary Examiner* — Jeffrey A Gaffin
*Assistant Examiner* — Ayesha Huertas Torres
(74) *Attorney, Agent, or Firm* — Jennifer Anda

(57) ABSTRACT

In response to receiving a first user action in relation to an object displayed on the rendered display, a collar is displayed on the rendered display around the object. The collar and the object can be made translucent. The collar can have the same shape as the object, but can be larger in size than the object. In response to receiving a second user action in relation to the collar, the object and the collar are moved on the rendered display in correspondence with the second user action, without finalizing a current location of the object on the rendered display after the second user action has been completed. In response to receiving a third user action, the current location of the object is finalized on the rendered display and the collar is removed from around the object on the rendered display.

20 Claims, 6 Drawing Sheets

(56) References Cited

U.S. PATENT DOCUMENTS

| | | | |
|---|---|---|---|
| 7,770,135 B2* | 8/2010 | Fitzmaurice | G06F 3/0488 |
| | | | 715/808 |
| 7,884,834 B2 | 2/2011 | Mouilleseaux | |
| 8,202,147 B2 | 6/2012 | Yamada | |
| 8,863,027 B2 | 10/2014 | Lection et al. | |
| 2002/0018051 A1* | 2/2002 | Singh | G06F 3/0488 |
| | | | 345/173 |
| 2004/0104894 A1* | 6/2004 | Tsukada | G06F 1/1616 |
| | | | 345/168 |
| 2006/0132460 A1 | 6/2006 | Kolmykov-Zotov | |
| 2008/0307368 A1* | 12/2008 | Sabatelli | G06F 3/04855 |
| | | | 715/854 |
| 2009/0015600 A1* | 1/2009 | Ouchi | G09G 5/00 |
| | | | 345/684 |
| 2009/0119597 A1* | 5/2009 | Vaughan | G06F 3/048 |
| | | | 715/732 |
| 2009/0199119 A1 | 8/2009 | Park | |
| 2009/0267907 A1 | 10/2009 | Noma | |
| 2010/0060597 A1* | 3/2010 | Choi | G06F 3/04886 |
| | | | 345/173 |
| 2010/0238131 A1 | 9/2010 | Aoyagi | |
| 2010/0275033 A1 | 10/2010 | Gillespie | |
| 2010/0328232 A1* | 12/2010 | Wood | G06F 3/0488 |
| | | | 345/173 |
| 2012/0183172 A1 | 7/2012 | Stroila | |
| 2012/0272170 A1 | 10/2012 | Hammoud | |
| 2013/0027318 A1 | 1/2013 | Lection et al. | |
| 2013/0082969 A1 | 4/2013 | Moriyama | |

OTHER PUBLICATIONS

Final office action for U.S. Appl. No. 13/194,984 dated Feb. 14, 2014, 25 pp.

Notice of allowance for U.S. Appl. No. 13/194,984 dated Jun. 9, 2014, 11 pp.

* cited by examiner

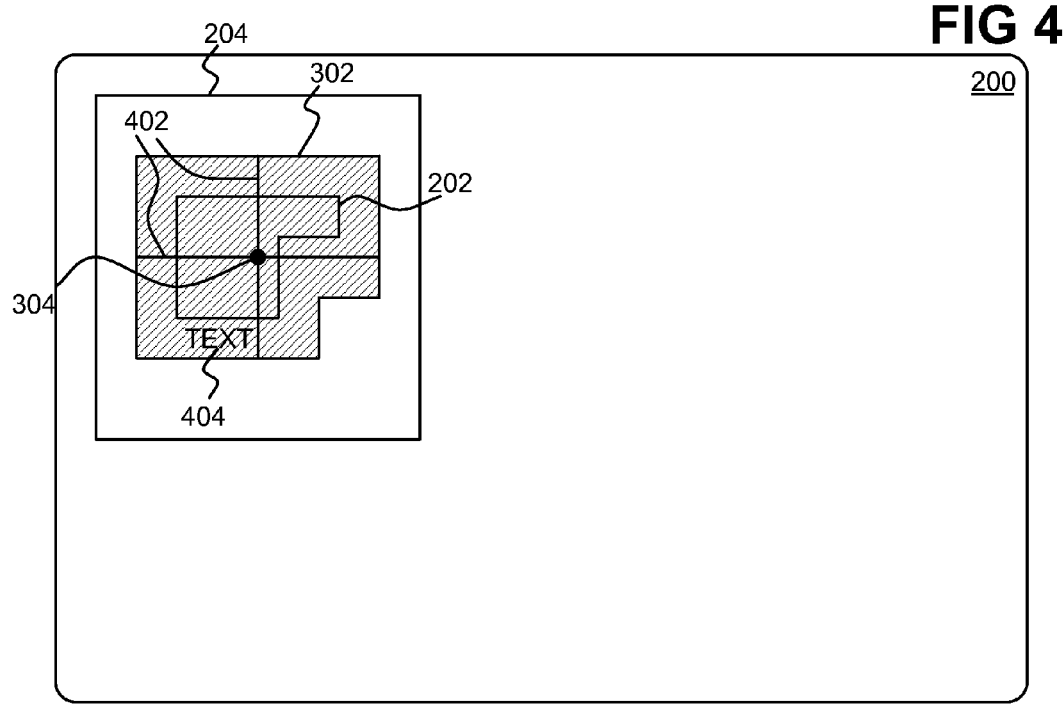
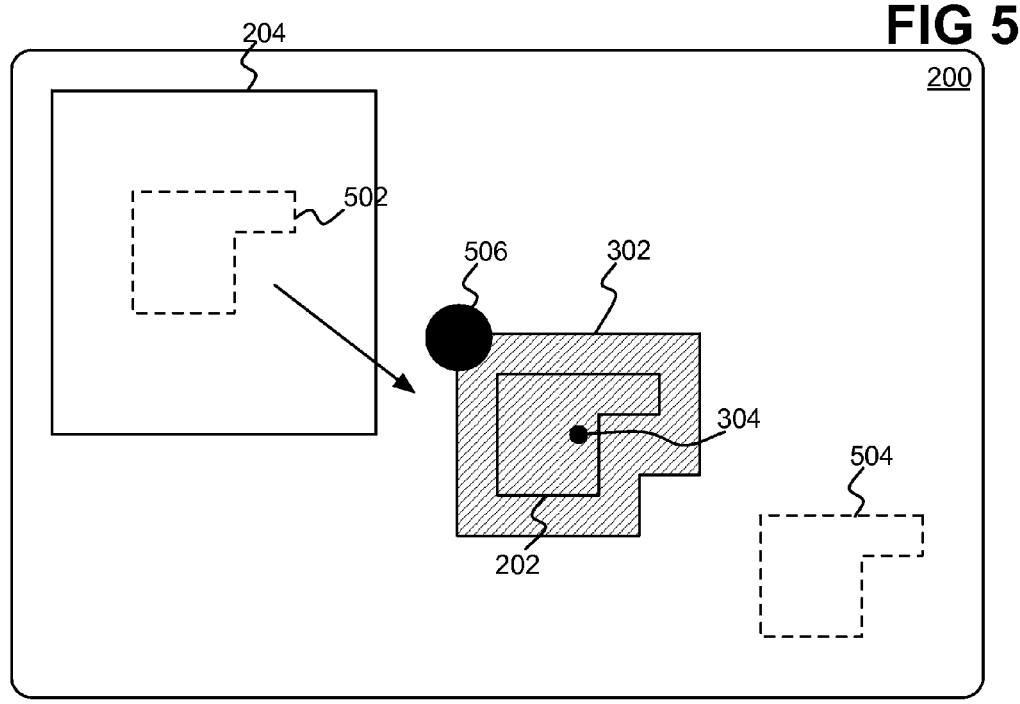

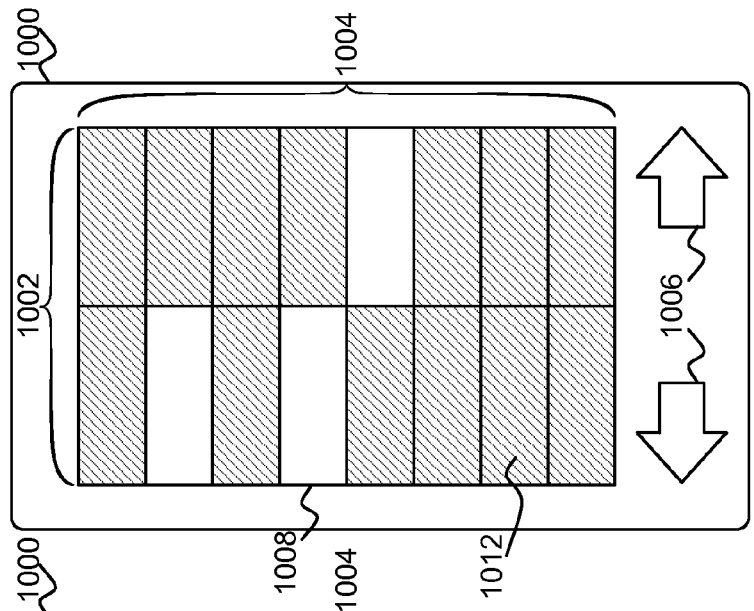
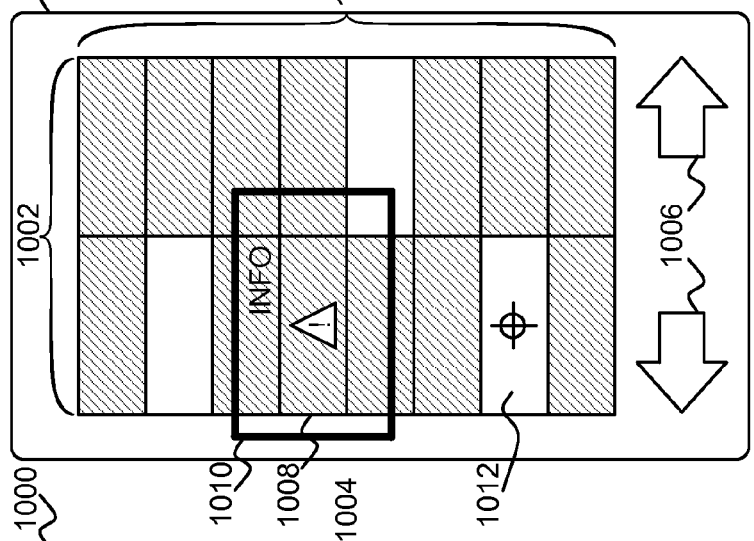
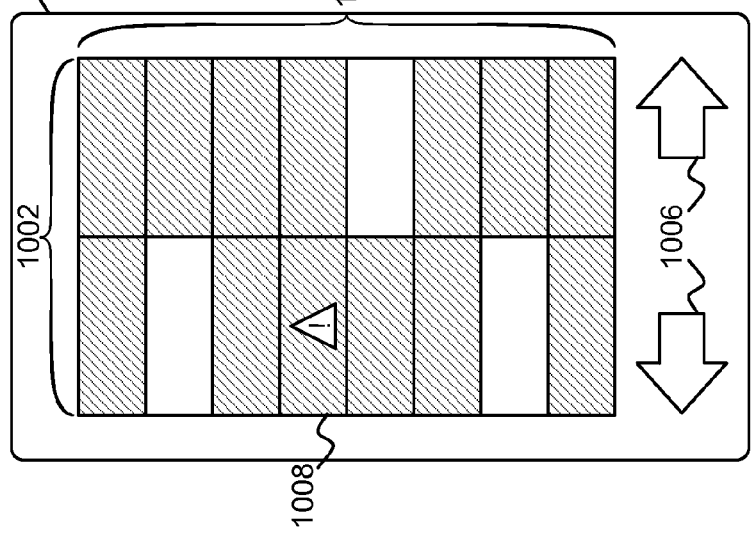

MOVING OBJECT ON RENDERED DISPLAY USING COLLAR

RELATED APPLICATIONS

The present patent application is a continuation of patent application Ser. No. 13/194,984, filed on Jul. 31, 2011.

BACKGROUND

A touchscreen is a type of rendered display that visually presents information to a user no differently than a non-touch rendered display does, but in relation to which a user can directly provide input. A touchscreen device receives user input by detecting placement of a user's finger or a stylus on or near the surface of the touchscreen, in a resistive, capacitive, optical, or other manner. Examples of devices that include touchscreen devices include tablet computing devices, desktop computing devices with integrated or external touchscreen devices, smartphones, and other types of devices.

SUMMARY

A method of an embodiment of the invention includes, in response to receiving a first user action in relation to an object displayed on the rendered display, displaying a collar around the object on the rendered display, by a processor. The method includes, in response to receiving a second user action in relation to the collar, moving the object and the collar on the rendered display in correspondence with the second user action, by the processor, without finalizing a current location of the object on the rendered display after the second user action has been completed. The method includes, in response to receiving a third user action, finalizing the current location of the object on the rendered display and removing the collar from around the object on the rendered display, by the processor.

A computer program product of an embodiment of the invention includes a computer-readable storage medium having computer-readable code embodied therein. The computer-readable code is executable by a processor and includes first computer-readable code to display a collar around an object displayed on a touchscreen, responsive to a first user action on the touchscreen in relation to the object. The computer-readable code includes second computer-readable code to move the object and the collar on the touchscreen in correspondence with a second user action, without finalizing a current location of the object on the touchscreen after the second user action has been completed. The computer-readable code includes third computer-readable code to finalize the current location of the object on the touchscreen and remove the collar from around the object on the touchscreen, responsive to a third user action on the touchscreen.

A system of an embodiment of the invention includes a touchscreen device providing a display and receptive to user input, a processor, and a computer-readable data storage medium to store a computer program executable by the processor. The computer program is to display a collar around an object displayed on the display responsive to first user input in relation to the object. The computer program is to move the object and the collar on the display in correspondence with second user input in relation to the collar, without finalizing a current location of the object on the display after the second user input has been completed. The computer program is to finalize the current location of the object on the touchscreen and remove the collar from around the object on the display, responsive to third user input in relation to the collar.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIGS. 3, 4, 5, 6, 7, and 8 are diagrams of the example touchscreen of FIG. 2 after different parts of the method 100 have been performed, according to varying embodiments of the invention.

FIGS. 10A, 10B, and 10C are diagrams of example performance of the method 100 within a particular scenario, according to an embodiment of the invention.

DETAILED DESCRIPTION

Figure 1:
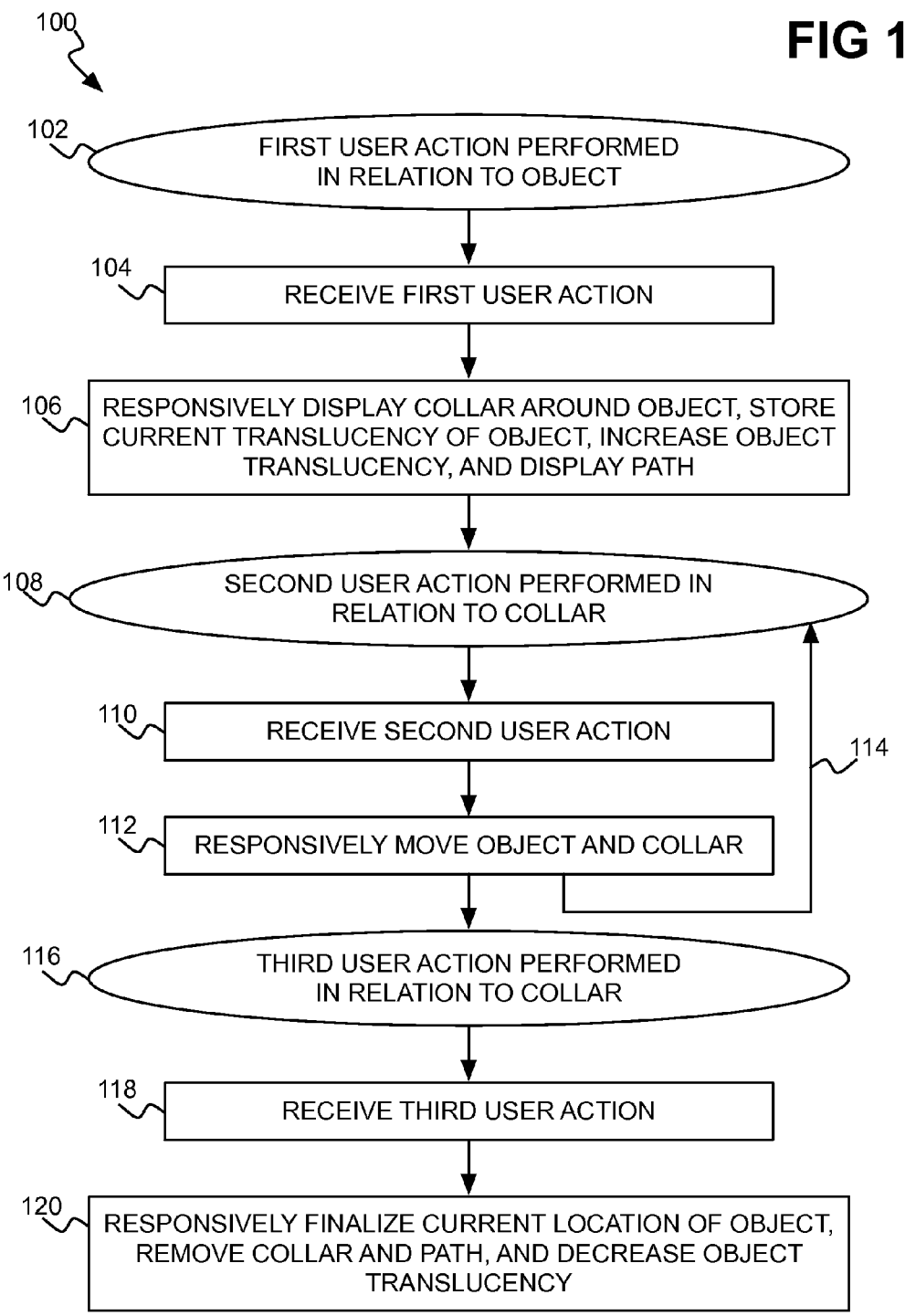
FIG. 1 is a flowchart of a method for moving an object on a rendered display, like a touchscreen, using a collar, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, touchscreen devices are devices that both display information to users and receive input from the users. Touchscreen devices permit users to move objects displayed on touchscreens, such as by touch and drag actions. In a touch and drag action, a user touches the touchscreen where the object is displayed, moves his or her finger or a stylus on the touchscreen to where the object is to be moved, and then stops touching the touchscreen to release the object at its new location.

Such existing techniques to move objects on touchscreens can be problematic. For smaller touchscreens, the object may be small, making it difficult for the user to select and then move using a touch and drag action. Furthermore, the user's finger, or the stylus, may block the user's view of the object. As such, it can be difficult for the user to precisely position the object at a desired location.

For larger touchscreens, the location to which the object is desired to be moved may be far away from the object's current location. As such, when using a touch and drag action, the user has to be extra careful to ensure that his or her finger, or a stylus, remains pressed on the touchscreen during the entire action. Otherwise, the object may be moved to an undesired location short of the location to which the user wants to move the object. Alternatively, if the user removes his or her finger, or the stylus, while the object is at a location to which it cannot be moved, the object may default back to its original position, which can be frustrating.

However, embodiments of the present invention described herein are advantageous over these existing techniques. A first user action performed in relation to an object displayed on a touchscreen, such as a tap on the touchscreen by a user, causes a collar to be displayed around the object on the touchscreen. The collar can be the same shape as the object, but have a size greater than the object, and can be translucent. Responsive to the first user action, the object itself may also be made translucent. The collar being greater in size permits the user to use the collar instead of the object to move the object, such that the object may remain visible even while the user has his or her finger, or a stylus, over a portion of the collar.

A second user action performed in relation to the collar causes the object and the collar to move on the touchscreen in correspondence with this action, but without finalizing the current location of the object on the touchscreen after the second user action has been completed. For instance, if the user inadvertently or purposefully removes his or her finger from the touchscreen while performing a touch and drag action, causing the second user action to be completed, the object's current location is not finalized as the ultimate destination of the object. The user can rather perform another second user action to continue moving the object and the collar.

A third user action that is performed, such as another tap on the touchscreen by the user, then finalizes the current location of the object on the touchscreen. The collar is further removed from around the object on the touchscreen. As such, the general process disclosed herein to move an object is: the user selects an object via a first user action, which causes the display of a collar; the user uses the collar to move the object to a desired location via one or more second user actions; and, the user indicates that the object is at its desired location via a third user action.

FIG. 1 shows a method 100, according to an embodiment of the invention. The method 100 is for moving an object on a rendered display. Parts of the method 100 that are indicated by rectangles in FIG. 1 may be performed by a processor, such as the processor of a device that includes a rendered display device, or to which the rendered display device is attached. While embodiments of the invention are specifically described herein primarily in relation to a rendered display device that is a touchscreen device, the embodiments of the invention are more generally applicable to different types of rendered display devices as well.

In general, a rendered display device is an electronic device that presents, or renders, a display. The rendered display device may be part of a computing device, for instance, or may be attached to a computing device. Rendered display devices include cathode-ray tube (CRT) devices, liquid crystal display (LCD) devices, plasma display devices, light-emitting diode (LED) display devices, and other types of devices. These example display devices generally render two-dimensional displays, but can also render three-dimensional displays, with or without users having to wear special glasses.

Other examples of rendered display devices include electronic devices that project displays. A typical projection device, for instance, may project a two-dimensional display onto a surface such as a screen. However, a holographic projection device can project a holographic display in space, as opposed to on a surface like a screen. For instance, a holographic projector may project a holographic display within a two-dimensional plane or a three-dimensional volume in space.

The rendered display device may further provide a manner by which the user can directly or indirectly interact with the displayed information. For example, CRT devices, LCD devices, plasma display devices, LED display devices, and so on, may be touchscreen devices, in which a user can position a stylus or his or her finger against a touchscreen to interact with the displayed information in a relatively direct manner. By comparison, indirect interaction can include the user using a pointing device, such as a mouse or a track pad, to interact with the displayed information. With respect to projection devices, various types of sensors may be employed to determine where the user is positioning a pointer, stylus, a body part, and so on, in relation to the rendered (i.e., projected) display.

A user performs a first user action in relation to an object displayed on the rendered display (102), and the method 100 receives this first user action (104). An example of such a first user action in relation to an object displayed particularly on a touchscreen is a tap action that the user performs on the touchscreen over where the object is displayed. In a tap action, the user uses his or her finger, or a stylus, to tap, or momentarily or quickly press, the touchscreen where the object is displayed on the touchscreen.

Figure 2:
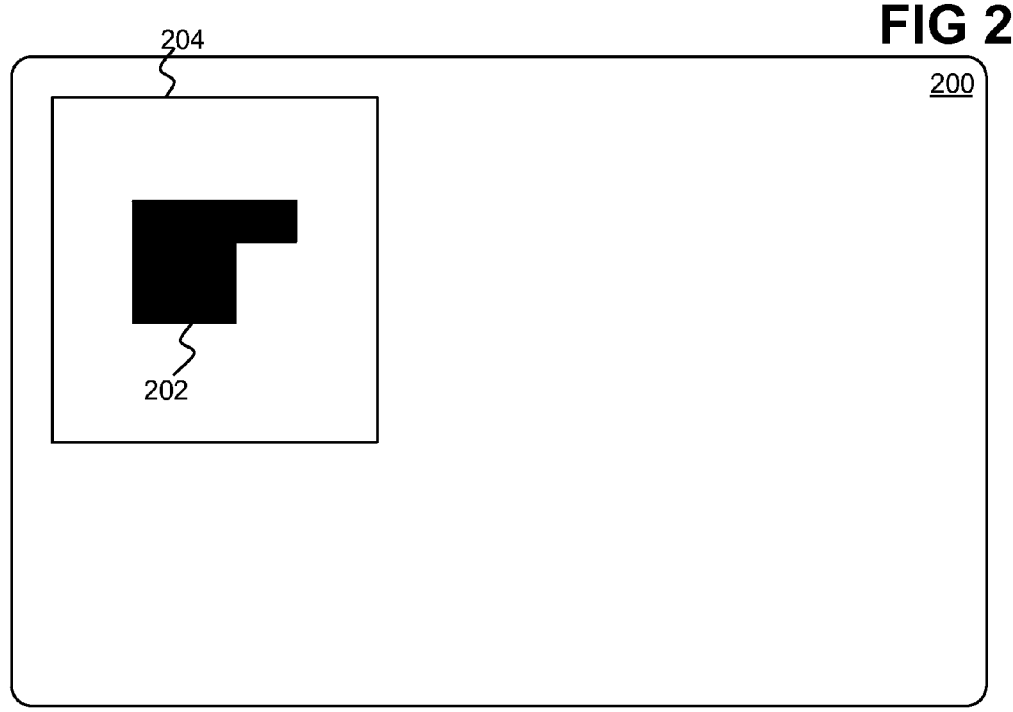
FIG. 2 is a diagram of an example touchscreen on which an object is displayed, in relation to which parts of the method 100 can be performed, according to an embodiment of the invention.

FIG. 2 shows an example touchscreen 200 in relation to which parts 102 and 104 of the method 100 can be performed, according to an embodiment of the invention. An object 202 is displayed on another object 204 on the touchscreen 200. The object 202 may be a graphical user interface (GUI) element that the user can select and move. The object 204 may be considered a background object that remains stationary. The object 202 is opaque in the example of FIG. 2, such that the object 204 is not visible through the object 202. The user performs the first user action in relation to the object 202.

Referring back to FIG. 1, in response to receiving the first user action, the method 100 displays at least a collar around the object (106). The collar can have the same shape as the object, but is larger in size than the object. The collar and the object are centered about the same center point, such that the collar is concentric with the object. The collar itself is another object.

The size of the collar can be set in correspondence with the area of the rendered display that was actuated as a result of the first user action. For example, a user may have performed a tap action on a touchscreen over where the object is displayed on the touchscreen. In performing this tap action, the user may have pressed his or her finger on the touchscreen. One type of touchscreen, which is known as a multi-touch touchscreen, can register more than one point on the touchscreen being touched at the same time. The collection of these points is thus the area of the rendered display that was actuated as a result of the first user action, and the collar can be sized based on this area. Therefore, the more points on the touchscreen that the user selected, the greater the size the collar is. As such, the size of the collar can be set in accordance with the size of the portion of the user's finger, or a stylus, that was used to depress the touchscreen.

The size of the collar can further be set in correspondence with the area of the rendered display that was actuated as a result of one or more prior user actions, such as on average. For instance, each time a user performs a tap action, the size of the area that the user touched may be recorded. The size of the collar is therefore set based on the average size of these areas that the user touched when having performed such tap actions.

The center point of the collar and the object may be, but does not have to be, accentuated so that it is visible. This permits the user to more precisely position the object when subsequently moving the object on the touchscreen. Similarly, the collar may include, but does not have to include, a set of cross hairs that extend radially from the center point, to assist the user in precisely positioning the object where desired. The collar may include, but does not have to include status information regarding the object as well.

The method 100 may, but does not have to, further store the current translucency of the object, and then increase the object's translucency (106). The collar may also be made, but does not have to be made, translucent. In these ways, any background displayed on the rendered display behind the object and the collar is visible through the object and the collar. The method 100 may also display, but does not have to display, a path extending from the object. The path indicates where the object is permitted to be moved. The path may be linear or non-linear, and there can be more than one such path.

Figure 3:
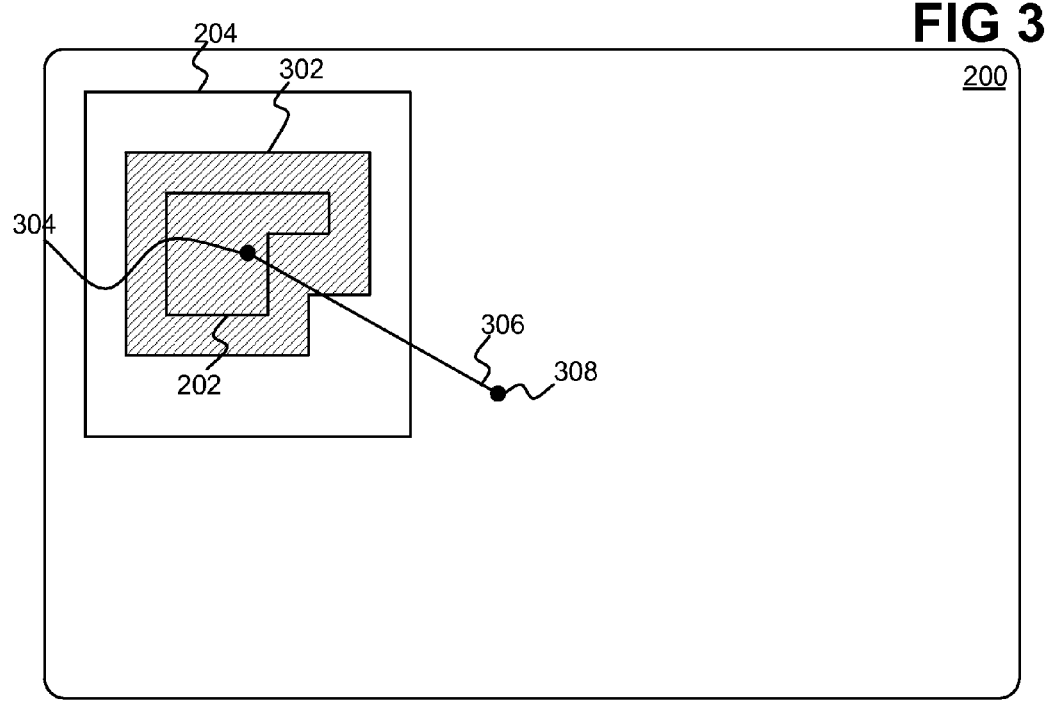

FIG. 3 shows the touchscreen 200 of FIG. 2 after example performance of part 106, according to an embodiment of the invention. The touchscreen 200 includes the object 202 displayed against the background object 204, as before. A collar 302 is displayed around the object 202. As can be seen in FIG. 2, the collar 302 is centered about the object 202, and has the same shape as but is larger in size than the object 202. The object 202 is shaded in a lighter manner in FIG. 3 than in FIG. 2 to indicate that its translucency has been increased to permit the background object 204 to be visible through the object 202. The collar 302 has the same shading as the object 202 in FIG. 3 to likewise indicate that it is translucent.

The collar 302 and the object 202 have a center point 304 that is accentuated in FIG. 3. That is, the center point 304 is made clearly visible on the touchscreen 200. A path 306 can extend from the center point 304 to an end point 308. The path 306 indicates where the object 202 can be permissibly moved on the touchscreen 200. Specifically, the object 202 can be moved so that its center point 304 is anywhere along the path 306 through to and including the end point 308 thereof.

FIG. 4 shows the collar 302 displayed around the object 202 on the touchscreen 200 of FIG. 2, according to another embodiment of the invention. As in FIG. 3, the object 202 and the collar 302 are shaded in a lighter manner in FIG. 4 than in FIG. 2 to indicate that they are translucent to permit the background object 204 to be visible through the object 202 and the collar 302. The center point 304 of the collar 302 and the object 202 are also accentuated in FIG. 4 as in FIG. 3.

The collar 302 includes a set of crosshairs 402 in the embodiment of FIG. 4, to permit the user to more precisely move the object 202 to a desired location. The collar 302 further includes text 404. The text 404 can provide status information regarding the object 202, for instance.

Referring back to FIG. 1, the user performs a second user action in relation to the collar displayed on the rendered display (108), and the method 100 receives this second user action (110). An example of such a second user action in relation to a collar displayed particularly on a touchscreen is a touch and drag action that the user performs on the touchscreen initially over which the collar is displayed. In a touch and drag action, the user uses his or her finger, or a stylus, to touch the touchscreen on any portion thereof where the collar is displayed on the touchscreen, and then, while still touching the touchscreen, move this finger or stylus on the touchscreen based on where the user wants to move the object.

In response to receiving the second user action, the method 100 moves the object and the collar on the rendered display in correspondence with the second user action (112). For example, the user may touch his or her finger on a touchscreen over where the collar is displayed, and then while still touching the touchscreen move this finger to the right. The method 100 thus correspondingly moves both the object and the collar to the right as well, as displayed on the touchscreen.

The movement of the object and the collar is further in correspondence with a path that may have been displayed. For example, if the path is downwards and to the right, but the user is attempting to move the object and the collar just to the right, the object and the collar will snap to the path so that they move along the path. If there is more than one path, then the object and the collar will snap to the path that most closely matches the second user action.

Unlike as in conventional techniques, the user does not have to have his or her finger or a stylus positioned on a touchscreen where the object itself is displayed, but just where the collar is displayed. Because the collar is larger in size than the object, this means that the user has a larger target to touch on the touchscreen. Furthermore, again because the collar is larger in size than the object, the object may remain visible because it is not obfuscated by the user's finger or stylus, which can permit the user to more precisely move the object to a desired location.

It is noted that the collar is said to include or encompass the object, insofar as the object is completely located within the collar. Therefore, that the user performs a second user action in relation to the collar means that the user can perform this action in relation to the object, too. That is, while the user can use the collar to move the object, the user can still use the object to move the object as well.

Importantly, once the user has completed the second user action, the current location of the object on the rendered display is not yet finalized. That is, the method 100 does not interpret completion of the second user action as indication by the user that the object's current location is the ultimate location to which the object should be moved. Rather, the user can perform another second action in relation to the collar to keep moving the object (114).

For example, the user may perform a touch and drag action in relation to a collar displayed on a touchscreen, using his or her finger, to move an object to a desired location. For whatever reason, the user may lift his or her finger from the touchscreen prior to having moved the object to the desired location. Existing techniques would interpret the removal of the user's finger from the touchscreen as the user indicating that the object has reached its desired location, and thus would finalize the current location as the ultimate location to which the object is to be moved.

This scenario can be particularly deleterious where, as noted above, the current location where the user has accidentally placed the object is an impermissible location for the object in question. For example, when moving an object from one area to another area, the user may accidentally place the object in a third area. The application program associated with the third area may immediately perform processing on the object, which was not the user's intention. Alternatively, the third area may be an impermissible area in which the object cannot be placed, resulting in the object snapping back to its original location, and causing the user to have to restart the movement process again.

By comparison, the method 100 does not make any interpretation as to the completion of the second user action—accidental or otherwise—signaling the intended desired location of the object. The user can instead perform another second user action in relation to the collar to continue moving the object, even after lifting his or her finger from the touchscreen. The method 100 does not finalize the current location of the object until the user has performed a different, third user action, as described in detail below.

Figure 6:
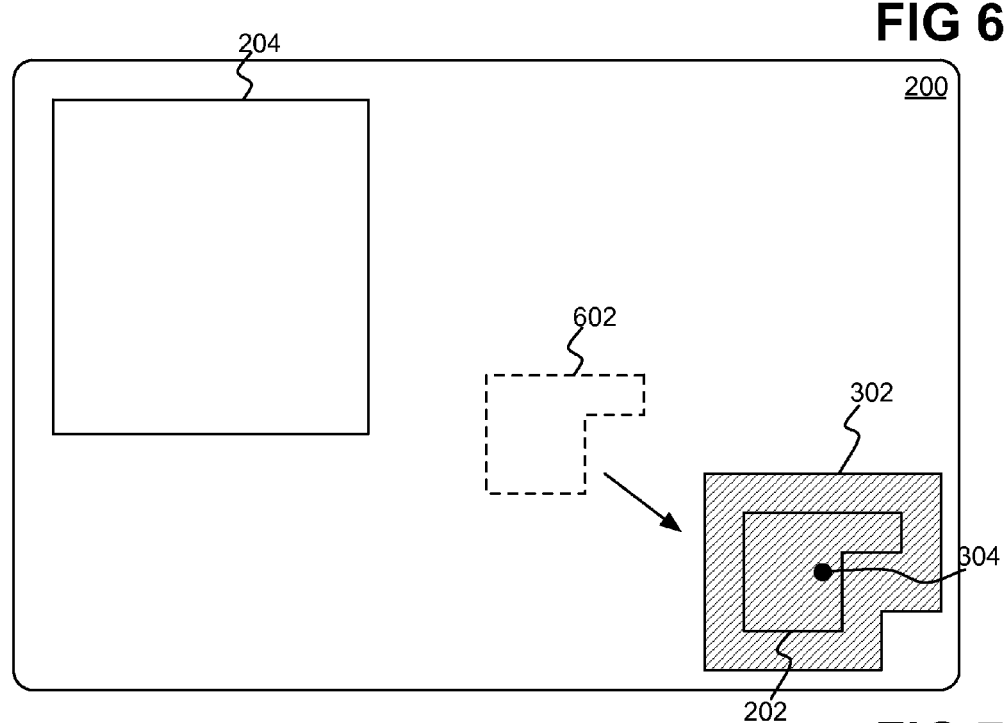

FIGS. 5 and 6 show the touchscreen 200 of FIG. 3 after two example performances of parts 108, 110, and 112 in succession, according to an embodiment of the invention. The object 202 and the background object 204 are displayed on the touchscreen 200 in FIGS. 5 and 6, as before. Likewise, the collar 302, including the center point 304 of the collar 302 and the object 202, is displayed on the touchscreen 200 in FIGS. 5 and 6, as before.

In FIG. 5, the user is attempting to move the object 202 from its original location 502 on the background object 204 to a desired location 504. The user has achieved this by performing a touch and drag action in relation to the collar 302. At the current location of the object 202 and the collar 302 depicted in FIG. 5, the user is touching the touchscreen 200 with his or her finger at a location 506, which encompasses a corner of the collar 302. As such, the object 202 itself is not obfuscated during movement of the object 202.

It is assumed in the example being described that the user accidentally lifts his or her finger from the touchscreen 200 while the object 202 and the collar 302 are at the location depicted in FIG. 5. As such, the second user action in question has been completed. However, as noted above, the method 100 does not interpret completion of the second user action as finalizing the current location of the object 202 on the touchscreen 200. Therefore, the collar 302 remains displayed around the object 202, and the current location of the object 202 is not interpreted as being the final intended destination of the object 202.

In FIG. 6, the user has performed another touch and drag action in relation to the collar 302, moving the object 202 from its prior position in FIG. 5, which is indicated in FIG. 6 as the location 602, to the final intended destination intended by the user. There is no location indicated in FIG. 6 that corresponds to the location 506 in FIG. 5. This is because the user has, after having moved the collar 302 and the object 202 to the location shown in FIG. 6, removed his or her finger from the touchscreen 200.

However, while moving the object 202 from the location 602 to the location shown in FIG. 6, the user may have performed the second touch and drag action in relation to the same portion of the collar 302 as in FIG. 5, or a different portion. That is, in FIG. 5, the user has touched the touchscreen 200 at the location 506, corresponding to a corner of the collar 302. When the user moves the object 202 from the location 602 to the location shown in FIG. 6, the user may touch the touchscreen 200 over the same corner of the collar 302, or a different part of the collar 302.

Note that in FIG. 6, even though the second user action has been completed, the collar 302 is still displayed around the object 202. This is because even though the user knows that the object 202 has been placed at its intended destination, the method 100 still does not know. As noted above, until the user performs a different, third user action in relation to the collar 302 does the method 100 interpret the current location of the object 202 as being the intended final location of the object 200.

It is noted that a legal area in which the object 202 can be moved may have been defined, such as by an application program in relation to which the object 202 has been displayed, and so on. If the user attempts to move the object 202 past a boundary of this legal area, the object 202 stops at the boundary and cannot be moved past the boundary. However, the collar 302 is still displayed around the object 202 on the touchscreen 200, insofar as possible, such that the collar 302 does extend past this boundary as displayed on the touchscreen 200.

Figure 7:
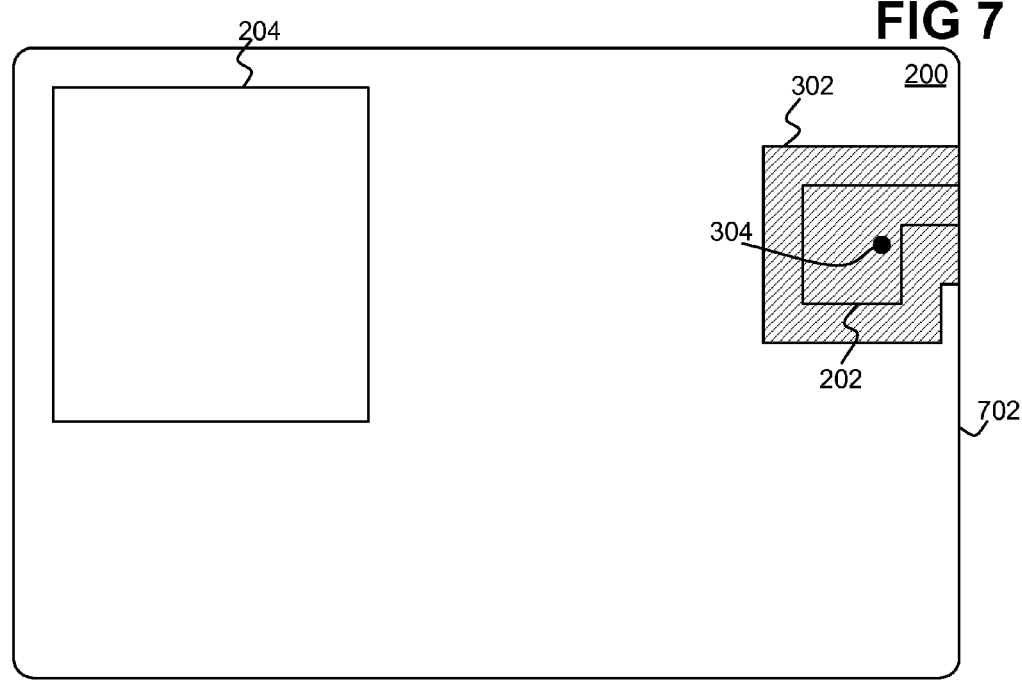

FIG. 7 shows an example in which the object 202 is not permitted to move past a boundary 702 on the touchscreen 200, but the collar 302 can move past the boundary, according to an embodiment of the invention. The touchscreen 200 includes background object 204, as well as the object 202, as before. The touchscreen 200 further includes the collar 302 having the center point of the object 202 and the collar 302.

In the example of FIG. 7, the boundary 702 is specifically the right edge of the touchscreen 200. However, in other scenarios, the boundary 702 can be a boundary of any arbitrarily defined legal area in which the object 202 is permitted to be moved on the touchscreen 200, and thus which may not be equal to the entirety of the touchscreen 200. For instance, a given legal area may have a boundary this is not collinear with any edge of the touchscreen 200.

In FIG. 7, the user has attempted to move object 202 past the boundary 702. The object 202 is not permitted to move past the boundary 702. However, the collar 302 can extend past the boundary 702. Therefore, the right-most portion of the collar 302 is not depicted in FIG. 7, because it resides past the right edge of the touchscreen 200.

Referring back to FIG. 1, the user performs a third user action displayed on the rendered display (116), and the method 100 receives this third user action (118). The third user action may be a tap action, like the first user action. The third user action may be performed in relation to the collar. Alternatively, the third user action may be performed not in relation to the collar.

For example, where the third user action is a tap action, the tap action may be performed on the touchscreen where the collar is displayed. In this case, the tap action is said to be performed in relation to the collar. As another example, however, the tap action may be performed anywhere on the touchscreen, and not just at a portion thereof where the collar is displayed. In this case, by comparison, the tap action is said to not be performed in relation to the collar.

In response to receiving the third user action, the method 100 finalizes the current location of the object (120). That is, the method 100 interprets the third user action as signaling that the current location of the object is the intended final destination of the object. The application program associated with the area to which the object has been moved may then perform processing on the object, as may have been intended by the user. Until the third user action is performed, however, the application program does not perform such processing, because the method 100 does not finalize the current location of the object until the third user action is performed.

The method 100 also removes the collar from being displayed on the rendered display, as well as any path for the object that may have been displayed (120). The removal of the collar may signal to the user that the method 100 has received the third user action, and that the method 100 is now treating the current location of the object as the intended final destination of the object. Similarly, the method 100 decreases the translucency of the object to its translucency as previously stored in part 106 (120).

Figure 8:
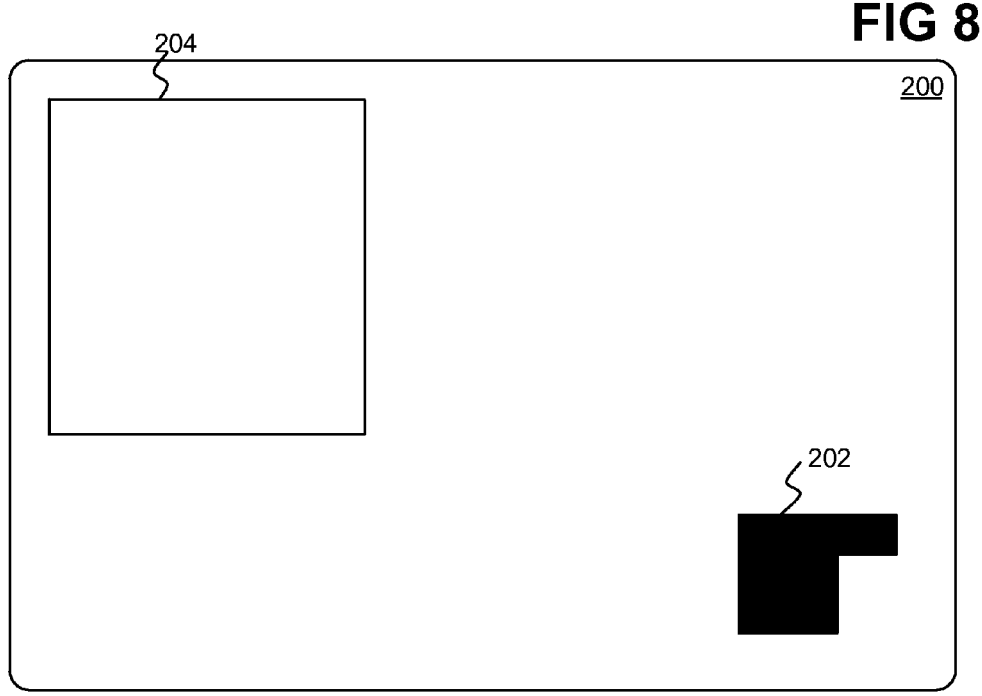

FIG. 8 shows the touchscreen 200 of FIG. 6 after example performance of parts 118 and 120, according to an embodiment of the invention. The touchscreen 200 includes the background object 204, as well as the object 202. The object 202 is in the same location as in FIG. 6 after the additional second user action has been performed. However, in FIG. 8 the location of the object 202 is now finalized, because the third user action has also been performed.

As such, the translucency of the object 202 has been increased to its original translucency as in FIG. 2. Furthermore, the collar 302, including the center point 304 of the collar 302 and the object 202, is not depicted in FIG. 8. Rather, the collar 302 has been removed from the touchscreen 200, due to the third user action having been performed.

Figure 9:
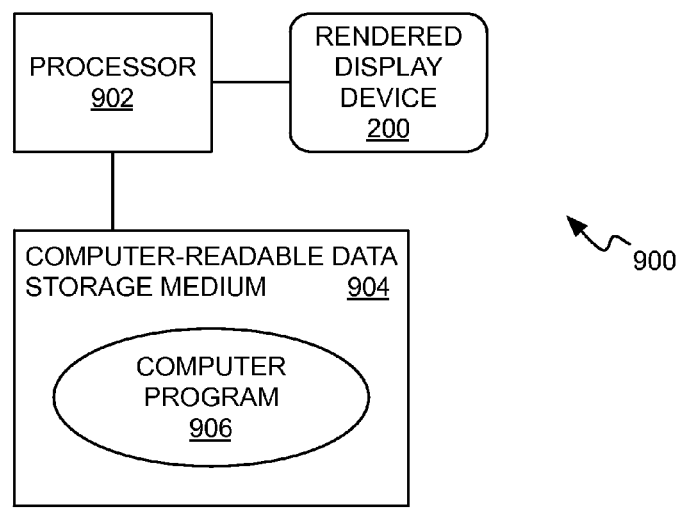
FIG. 9 is a diagram of a representative system, according to an embodiment of the invention.

FIG. 9 shows a representative system 900, according to an embodiment of the invention. The system 900 includes a rendered display device 901, which can be a touchscreen, a processor 902, and a computer-readable data storage medium 904. The system 900 can take the form of a device like a computing device, such as a desktop or laptop computer, a smartphone, or another type of computing device or device.

The rendered display device 901, the processor 902, and the computer-readable data storage medium 904 may be encased within a common housing. Alternatively, at least the rendered display device 901 may be disposed within a housing separate from that which includes the processor and the computer-readable data storage medium 904. The rendered display device 901 provides a rendered display. The display may be rendered on a portion of the device 901 itself, such as a screen that is part of the device 901, or the display may be rendered external to the device 901, such as in space or on a surface.

The computer-readable data storage medium 904 can include volatile and/or non-volatile computer-readable data storage media. The computer-readable data storage medium 904 stores a computer program 906. The computer program 906 is executable by the processor 902. Execution of the computer program 906 by the processor 902 results in the method 100 being performed.

FIGS. 10A, 10B, and 10C depict example performance of the method 100 in a particular scenario, according to an embodiment of the invention. The particular scenario relates to the management of server devices within racks, in which a user is presented with a graphical representation of the server devices within the racks. A rendered display 1000 shows two columns 1002 and eight rows 1004 of rack slots that server devices can populate. In the example of FIGS. 10A, 10B, and 10C, a slot is shaded if a server device occupies the slot, and is not shaded if a server device does not occupy the slot. Furthermore, arrows 1006 permit a user to view a prior set and a next set of rack slots.

In FIG. 10A, the slot 1008 has a warning graphic, indicating that the server occupying the slot 1008 should be moved for better performance, or for another reason. In FIG. 10B, when a user selects the server within the slot 1008, a collar 1010 is displayed around the server so that the user can better move the server to an empty slot. The slot 1012 has a suggestion graphic, indicating that moving the server from the slot 1008 to the slot 1012 would rectify the warning. In FIG. 10C, the user has moved the server to the slot 1012, such that the slot 1008 is now empty, and the server now occupies the slot 1012.

Variations and enhancements to this basic approach depicted in FIGS. 10A-10C can be made. When the user selects the server occupying the slot 1008, information regarding the server may be displayed within the collar 1010, which is depicted in FIG. 10B via the word "INFO". When the user has moved the collar 1010 sufficiently to permit the server to be released into the slot 1012 (i.e., when the server overlaps the slot 1012), the collar 1010 may change color to indicate this guidance to the user. If the user wishes to move the server to a different set of rack slots than that which includes the slot 1008, the user may move the collar 1010 so that the server being moved overlaps one of the arrows 1006. A prior or next set of racks may then be displayed to which the user can move the server, with the selection of the color 1010 persisting to the prior or next set of racks.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   in response to receiving a first user action in relation to an object displayed on a rendered display that is a touchscreen, displaying a collar around the object on the rendered display, by a processor;
   in response to receiving a second user action within a region of an area bounded by and including the collar, moving the object and the collar on the rendered display in correspondence with the second user action, by the processor, without finalizing a current location of the object on the rendered display after the second user action has been completed;
   in response to receiving a third user action, finalizing the current location of the object on the rendered display and removing the collar from around the object on the rendered display, by the processor; and
   recording an area of the touchscreen that is actuated during each of one or more fourth user actions prior to the first user action being performed,
   wherein the collar has a size in correspondence with areas of the touchscreen that have been actuated by the first user action and by the one or more fourth user actions,
   wherein the region is one of: a region on the collar and a region on the object.

2. The method of claim 1, wherein the first user action and the third user action are each a tap action performed by the user on the touchscreen,
   and wherein the second user action is a touch and drag action performed by a user on the touchscreen in relation to the object.

3. The method of claim 1, wherein the collar has a displayed size in correspondence with an area of the touchscreen that was actuated by the first user action.

4. The method of claim 1, wherein the second user action is one of a plurality of second user actions, such that after each second user action, a user is not touching the touchscreen, and the current location of the object on the touchscreen is not finalized after each second user action is performed until the third user action has been received.

5. The method of claim 1, wherein the collar has a same shape as the object but is larger in size than the object, the collar having a same center point as the object.

6. The method of claim 1, wherein the collar comprises one or more of:

an accentuated center point that is a same center point as the object;
a set of cross hairs extending radially from the center point; and
status information regarding the object.

7. The method of claim 1, further comprising:
in response to receiving the first user action,
storing a current translucency of the object as a saved translucency, by the processor; and,
increasing the current translucency of the object, by the processor, such that a background displayed on the rendered display behind the object is more visible through the object than with the saved translucency of the object, where the collar is also translucent such that the background displayed on the rendered display behind the collar is visible through the collar; and,
in response to receiving the third user action,
decreasing the current translucency of the object to the saved translucency that was previously stored, by the processor.

8. The method of claim 1, further comprising:
in response to receiving the first user action,
displaying a path on the rendered display, by the processor, the path indicating where the object is permitted to be moved;
in response to receiving the third user action,
removing the path from around the object on the rendered display, by the processor,
where moving the object and the collar on the rendered display in correspondence with the second user action is further in correspondence with the path.

9. The method of claim 1, wherein the object has a legal area in which the object is permitted to be moved on the rendered display,
wherein moving the object and the collar on the rendered display in correspondence with the second user action is such that when the object reaches a boundary of the legal area, the object cannot be moved past the boundary but the collar is still displayed around the object on the rendered display such that the collar extends past the boundary of the legal area.

10. A non-transitory computer program product comprising:
a non-transitory computer-readable storage medium having computer-readable code embodied therein, the computer-readable code executable by a processor and comprising:
first computer-readable code to display a collar around an object displayed on a touchscreen, responsive to a first user action on the touchscreen in relation to the object;
second computer-readable code to move the object and the collar on the touchscreen in correspondence with a second user action within a particular region that is one of a region directly on the collar and a region directly on the object, without finalizing a current location of the object on the touchscreen after the second user action has been completed; and,
third computer-readable code to finalize the current location of the object on the touchscreen and remove the collar from around the object on the touchscreen, responsive to a third user action on the touchscreen.

11. The non-transitory computer program product of claim 10, wherein the collar has a displayed size in correspondence with at least an area of the touchscreen that was actuated by the first user action.

12. The non-transitory computer program product of claim 10, wherein the second user action is one of a plurality of second user actions, such that after each second user action, a user is not touching the touchscreen, and the current location of the object on the touchscreen is not finalized after each second user action is performed until the third user action has been received.

13. The non-transitory computer program product of claim 10, wherein the collar has a same shape as the object but is larger in size than the object, the collar having a same center point as the object.

14. The non-transitory computer program product of claim 10, wherein the collar comprises one or more of:
an accentuated center point that is a same center point as the object;
a set of cross hairs extending radially from the center point; and
status information regarding the object.

15. The non-transitory computer program product of claim 10, wherein the first computer-readable code is further to store a current translucency of the object as a saved translucency, and to increase the current translucency of the object, where the collar is also translucent,
and wherein the third computer-readable code is further to decrease the current translucency of the object to the saved translucency that was previously stored.

16. The non-transitory computer program product of claim 10, wherein the first computer-readable code is further to display a path on the touchscreen indicating where the object is permitted to be moved,
wherein the second computer-readable code is to move the object and the collar on the touchscreen both in correspondence with the second user action and in correspondence with the path,
and wherein the third computer-readable code is further to remove the path from around the object on the touchscreen.

17. The non-transitory computer program product of claim 10, wherein the object has a legal area in which the object is permitted to be moved on the touchscreen,
and wherein the second computer-readable code is to move the object and the collar on the touchscreen in correspondence with the second user action such that when the object reaches a boundary of the legal area, the object cannot be moved past the boundary but the collar is still displayed around the object on the touchscreen such that the collar extends past the boundary of the legal area.

18. A system comprising:
a touchscreen device providing a display and receptive to user input;
a processor; and,
a computer-readable data storage medium to store a computer program executable by the processor to:
display a collar around an object displayed on the display responsive to first user input on the display in relation to the object;
move the object and the collar on the display in correspondence with second user input within a particular region that is one of a region directly on the collar and a region directly on the object, without finalizing a current location of the object on the display after the second user input has been completed; and, finalize the current location of the object on the display and remove the collar from around the object on the display, responsive to third user input in relation to the collar.

19. The non-transitory computer program product of claim 10, wherein the computer-executable code further comprises:
fourth computer-readable code to record an area of the display that is actuated during each of one or more fourth user actions prior to the first user action being performed,
wherein the collar has a size in correspondence with areas of the display that have been actuated by the first user action and by the one or more fourth user actions.

20. The system of claim 19, wherein the computer program is executable by the processor to further:
record an area of the display that is actuated during each of one or more fourth user inputs prior to the first user input being performed,
wherein the collar has a size in correspondence with areas of the display that have been actuated by the first user input and by the one or more fourth user inputs.

\* \* \* \* \*